(12) United States Patent
Sankaran et al.

(10) Patent No.: US 8,707,013 B2
(45) Date of Patent: Apr. 22, 2014

(54) ON-DEMAND PREDICATE REGISTERS

(75) Inventors: Jagadeesh Sankaran, Allen, TX (US);
Joseph R. Zbiciak, Arlington, TX (US);
Steven D. Krueger, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 887 days.

(21) Appl. No.: 12/835,320

(22) Filed: Jul. 13, 2010

(65) Prior Publication Data

US 2012/0017067 A1      Jan. 19, 2012

(51) Int. Cl.
*G06F 9/30*      (2006.01)

(52) U.S. Cl.
USPC .................................... 712/24; 712/208

(58) Field of Classification Search
USPC .......................................... 712/24
See application file for complete search history.

(56) References Cited

U.S. PATENT DOCUMENTS

| | | | | |
|---|---|---|---|---|
| 6,014,739 A | * | 1/2000 | Christie ......................... | 712/228 |
| 6,625,724 B1 | * | 9/2003 | Kahn et al. .................... | 712/229 |
| 7,685,402 B2 | * | 3/2010 | Garg et al. ..................... | 712/23 |
| RE44,190 E | * | 4/2013 | Guttag et al. ................. | 708/620 |
| 2006/0101252 A1 | * | 5/2006 | Tomisawa ...................... | 712/228 |
| 2006/0259739 A1 | * | 11/2006 | Asal et al. ..................... | 712/209 |

OTHER PUBLICATIONS

Texas Instruments Incorporated, "TMS320C64x+ DSP CSU and Instruction Set, Reference Guide," Literature No. SPRU7321, May 2010, p. 68.

* cited by examiner

*Primary Examiner* — Andrew Caldwell
*Assistant Examiner* — Keith Nielsen
(74) *Attorney, Agent, or Firm* — Robert D. Marshall, Jr.; W. James Brady; Frederick J. Telecky, Jr.

(57) ABSTRACT

In accordance with at least some embodiments, a digital signal processor (DSP) includes an instruction fetch unit and an instruction decode unit in communication with the instruction fetch unit. The DSP also includes a register set and a plurality of work units in communication with the instruction decode unit. The register set includes a plurality of legacy predicate registers. Separate from the legacy predicate registers, a plurality of on-demand predicate registers are selectively signaled without changing the opcode space for the DSP.

4 Claims, 5 Drawing Sheets

ON-DEMAND PREDICATE REGISTERS

BACKGROUND

There are many different ways of doing conditional execution. For some processing architectures, the condition determines whether an operation is executed. For other processing architectures, alternative operations are executed and the condition determines which result is used. The amount of conditional operations that can be performed is limited by the number of predicate registers available to store each condition and also opcode (encoding) limits.

As an example, the C64x processor core has six predicate registers and the C62x processor core has five predicate registers. The predicate register used for a particular instruction is signaled by bits 31-29 of the opcode space (the "creg" field). The sense of the predication is signaled by bit 28 of the opcode space (the "z" field). The predication values for the opcode space of the C64x and C62x processor cores is shown in Table 1.

TABLE 1

| Predication value | CREG value | Sense value |
|---|---|---|
| Unconditional | 000 | 0(z) |
| Software Breakpoints | 000 | 1(z) |
| B0 | 001 | 0/1(z) |
| B1 | 010 | 0/1(z) |
| B2 | 011 | 0/1(z) |
| A1 | 100 | 0/1(z) |
| A2 | 101 | 0/1(z) |
| A0 | 110 | 0/1(z) |
| Compact Instructions | 111 | 0(z) |

The only unused opcode space for the C64x and C62x processor cores is creg=111 and z=1. However, this unused opcode space is not even adequate to specify one predicate register since both values of the sense bit are not available. As applications become more complicated, availability of additional predicate registers would improve processing efficiency of the C64x and C62x processor cores or other processing architectures. However, changing the opcode space is not a viable option for processing architectures already in use.

SUMMARY

In accordance with at least some embodiments, a digital signal processor (DSP) includes an instruction fetch unit and an instruction decode unit in communication with the instruction fetch unit. The DSP also includes a register set and a plurality of work units in communication with the instruction decode unit. The register set includes a plurality of legacy predicate registers. Separate from the legacy predicate registers, a plurality of on-demand predicate registers are selectively signaled without changing the opcode space for the DSP.

In at least some embodiments, a method for a DSP with a register set includes detecting whether on-demand predication control bits for signaling use of at least one on-demand predicate register of the register set, separate from legacy predicate registers of the register set, are in the multi-instruction fetch packet. If the on-demand predication control bits are detected, the method also includes using on-demand predicate registers instead of legacy predicate registers for instructions of the multi-instruction fetch packet.

In at least some embodiments, a system includes a DSP having a register set and a storage medium with instructions of a program for execution by the DSP. The instructions are fetched from the storage medium for execution by the DSP in a multi-instruction packet. The system also includes on-demand predicate registers of the register set, separate from legacy predicate registers of the register set, that are selected for instructions of the multi-instruction packet without changing an opcode space for the DSP.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
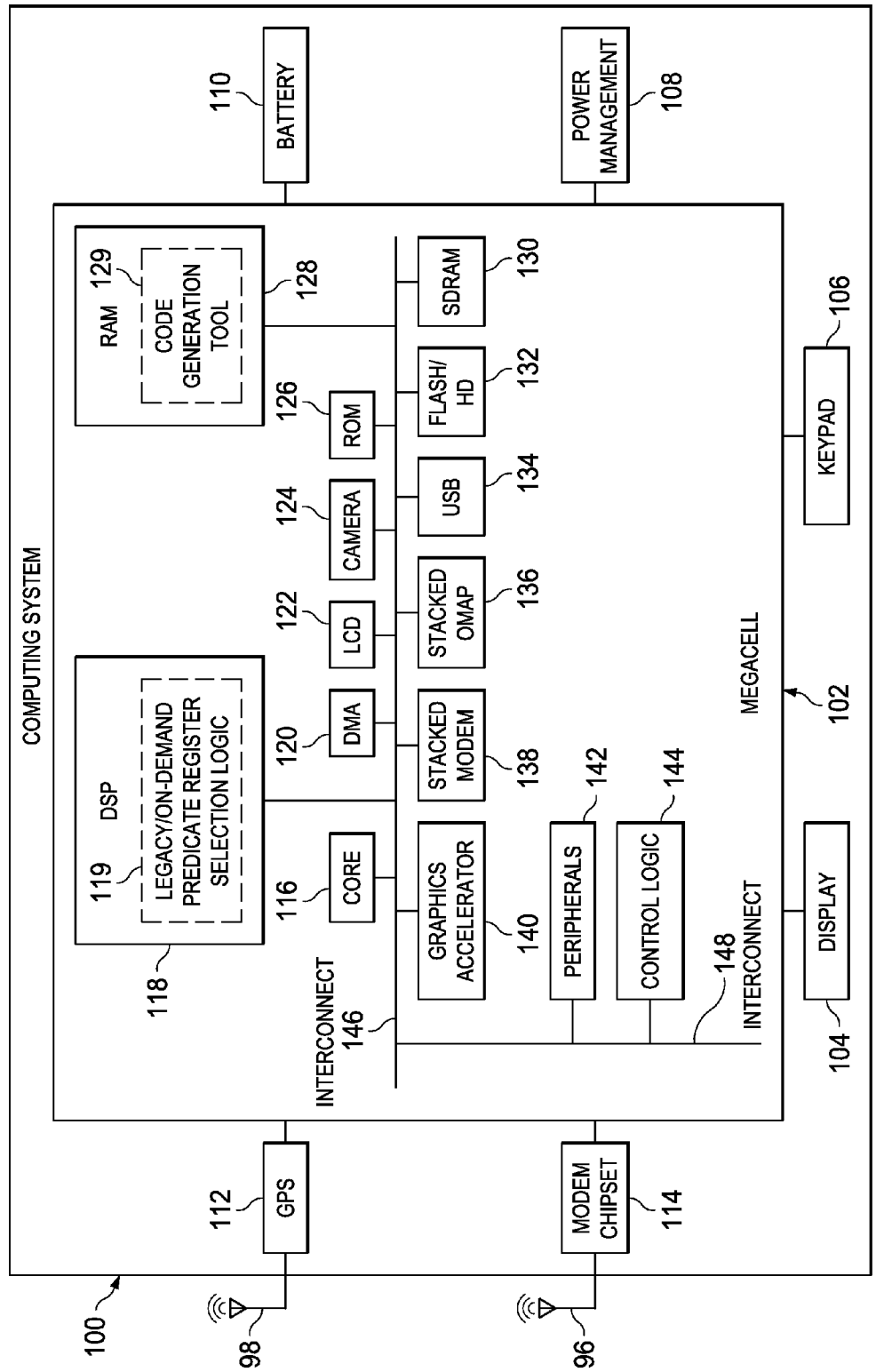
FIG. 1 illustrates a computing system in accordance with an embodiment of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to techniques for improving processing efficiency by using on-demand predicate registers in addition to legacy predicate registers of a digital signal processor (DSP), without changing the opcode space of the DSP. The on-demand predication techniques described herein are based on a code generation tool that is able to appropriately pre-allocate legacy predicate registers or on-demand predicate registers to instructions that will later be executed by a DSP. For example, if the code generation tool determines that the demand for predication for a number of execution cycles on a DSP will exceed a predetermined threshold, the code generation tool pre-allocates legacy predicate registers to some of the generated instructions and on-demand predicate registers to others of the generated instructions to be executed during those execution cycles. The code generation tool may, for example, generate a first set of instructions that are pre-allocated the legacy predicate registers, generate a second set of instructions that are pre-allocated the on-demand predicate registers, generate a third set of instructions that are pre-allocated the legacy predicate registers and so on. In some embodiments, these different sets of instructions are executed in different execution cycles. Further, some instructions and their related predication may require several execution cycles to complete. By generating code that appropriately pre-allocates legacy predicate registers and, as needed, on-demand predicate registers to instructions, embodiments enable improved processing efficiency for a DSP. In connection with the pre-allocated legacy predicate registers and on-demand predicate registers, DSP embodiments disclosed herein are configured to decode instructions with pre-allocated legacy predicate registers or pre-allocated on-demand predicate registers and then select the appropriate predicate register for an instruction based on the pre-allocation.

In at least some embodiments, instruction space in a multi-instruction fetch packet is selectively replaced with on-demand predication control bits to signal use of on-demand predicate registers. The on-demand predication techniques described herein were developed for very-long instruction word (VLIW) architectures (e.g., Texas Instrument's C64x+™ DSP core), but are not limited to any particular DSP. Rather, the on-demand predication techniques described herein may be utilized to increase the number of predicate registers available for use in a processing architecture in addition to legacy (predefined) predicate registers.

Programs to be executed on a DSP may be written in assembly language or in a high-level language. One difference between assembly language and high-level language is that assembly language manages the allocation of hardware resources such as registers in the program. Accordingly, an assembly language programmer or assembly language optimizer may pre-allocate legacy predicate registers or on-demand predicate registers to instructions as described herein. In contrast, high-level language does not manage resources such as registers, instead relying on a compiler to perform the pre-allocation of legacy predicate registers or on-demand predicate registers to instructions. As an example, predication values may be used by a program, either because there is an algorithmic predicate (e.g. "if (x[27]>6)") or because programming techniques that increase the program's speed (but need predication to insure that the program produces correct answers) are employed. Such programming techniques often require predicates that don't correspond to any condition obvious in the algorithm being programmed. The pre-allocation of predicate registers associates a predicate value to a physical register (in the case of C6x DSPs, a register such as A3). The code generation tool described herein may perform the assembly language optimizer operations and/or compiler operations described herein. In some embodiments, the code generation tool pre-allocates legacy predicate registers to instructions by default and selectively pre-allocates on-demand predicate registers only when predication demand of a program to be executed is determined by the code generation tool to exceed a predetermined threshold.

When a program is executed by a DSP, the instruction decode stage of the pipeline interprets the instructions. In C64x DSPs, an entire instruction fetch packet is decoded to produce 1 to 8 decoded instructions. Decoded instructions include control bits to select particular registers and particular functions to perform the desired operation. The C64x decoding has both fetch packet level decoding and individual 32-bit instruction decoding. The instruction decoding stage produces all of the register selector signals that select which register is used for each operand. These selector signals include predicate register selectors and sense (z bit) selectors. The selected predicate register is tested according to the z bit to make a decision on whether this is an instruction that should execute or be skipped. If the instruction is to be skipped, the computation is performed, but no results are written to registers or to memory (if it is a ST* instruction).

In accordance with at least some embodiments, signaling use of legacy predicate registers or on-demand predicate registers is based on individual 32-bit instruction decoding. However, the inclusion of on-demand predication control bits for an instruction may result in overriding/ignoring the legacy control bits for other instructions of a fetch packet. In other words, the pre-allocation and selection of legacy predicate registers or on-demand predicate registers for instructions to be executed may be managed at a per-fetch packet level (each fetch packet will use legacy predicate registers or on-demand predicate registers, but not both). The on-demand predication encoding techniques disclosed herein may use, for example, fetch packet encoding (placing decode modifiers that work like shift keys into the fetch packet). As an example, for C64x DSPs, the encoding of the field that selects predicate registers (the creg field) only supports 6 predicate registers. In such embodiments, six on-demand predicate registers, separate from the six legacy predicate registers in the C64x DSP architecture, are selectively encoded.

In one embodiment, the encoding of on-demand predicate registers for instructions of a multi-instruction fetch packet is performed by using the vacant opcode space "1111" in the creg field and z field of one instruction (referred to as the on-demand predicate instruction) to convey new semantics and encode the predicates for other instructions of the multi-instruction fetch packet with the remaining bits (e.g., 28 bits) of the on-demand predicate instruction. Another predicate encoding scheme for the remaining bits would be to code a base of 4-5 bits and then carry offsets for the predicates with respect to this base. This encoding scheme partitions the register set into windows. For example, encoding of registers A10-A12 as on-demand predicate registers for register set A corresponds to a base of 10 and offsets of 0, 1, and 2. Likewise, encoding of registers B10-B12 as on-demand predicate registers for register set B corresponds to a base of 10 and offsets of 3, 4, and 5. In this embodiment, the base is encoded in 5 or 6 bits (e.g., a base of 0-32 may be encoded) and offsets are encoded in 3-bits (e.g., 7 predicates would consume 21 bits as offsets).

In another embodiment, a control register is programmed to convey a new base predicate and to use the previous predicates as offsets from this base. The control register is also programmed with a window of N cycles in which the new semantics are applicable. In another embodiment, 32-bits of the $8^{th}$ instruction of a multi-instruction fetch packet signals use of on-demand predicate registers and the particular on-demand predication registers to be used. In this embodiment, the maximum instruction level parallelism (or instructions that can be executed per cycle) is reduced to 7 instead of 8 in the traditional scheme. The reduction of IPC (instructions per cycle) from 8 to 7, should not be much of an issue, as highly conditional code typically does not have as much parallelism as data parallel code.

The original encoding scheme of C6x DPSs may be viewed as a "vertical" distributed encoding, where 4-bits were spent per instruction across 8 instructions, to specify predicate and serial/parallel execution. The registers available to be allocated for use as hardware predicates are limited to only 6 registers. The limitation is because only 6 particular registers can be encoded in the "vertical scheme" using the creg/z fields. The creg/z field cannot be increased in size because all of the bits of instruction encodings are already used. So a "horizontal" encoding schemes is needed to enables encoding of a greater number of registers for the hardware predicates. The encoding disclosed herein for on-demand predicate register selection may be viewed as a "horizontal" (centralized) 32-bit encoding as the predicate information of all 7 previous operations are encoded in the $8^{th}$ instruction's 32-bit opcode. The encoding of legacy predicate registers or on-demand predicate registers described herein (performed, for example, by software) must match the hardware decoding configuration of the DSP. So any change in encoding requires the implementation of decoding hardware.

The on-demand predicate register allocation technique described herein enables better performance on highly conditional loops, better support for low level multi-threading (independent paths within a loop), and hyper-threading (execution of unrelated tasks in parallel). In multi-threading, conditional scenarios are created, including overlapping conditions across iterations. The creation of conditions enables more instructions to be executed concurrently (filling up the capacity of the DSP). Preferably, conditional scenarios are created to take advantage of parallel processing capacity of a DSP while avoiding branches, which are detrimental to the pipeline and change the context (i.e., code must be fetched from a different location).

FIG. 1 shows a computing system 100 in accordance with at least some embodiments of the invention. In accordance with embodiments, the computing system 100 implements on-demand predicate register allocation as described herein. Although computing system 100 is representative of an Open Multimedia Application Platform (OMAP) architecture, the scope of disclosure is not limited to any specific architecture. As shown, the computing system 100 contains a megacell 102 which comprises a processor core 116 (e.g., an ARM core) and a digital signal processor (DSP) 118 which aids the core 116 by performing task-specific computations, such as graphics manipulation and speech processing. The megacell 102 also comprises a direct memory access (DMA) 120 which facilitates direct access to memory in the megacell 102. The megacell 102 further comprises liquid crystal display (LCD) logic 122, camera logic 124, read-only memory (ROM) 126, random-access memory (RAM) 128, synchronous dynamic RAM (SDRAM) 130 and storage (e.g., flash memory or hard drive) 132. The megacell 102 may further comprise universal serial bus (USB) logic 134 which enables the system 100 to couple to and communicate with external devices. The megacell 102 also comprises stacked OMAP logic 136, stacked modem logic 138, and a graphics accelerator 140 all coupled to each other via an interconnect 146. The graphics accelerator 140 performs necessary computations and translations of information to allow display of information, such as on display 104. Interconnect 146 couples to interconnect 148, which couples to peripherals 142 (e.g., timers, universal asynchronous receiver transmitters (UARTs)) and to control logic 144.

In accordance with at least some embodiments of the invention, the computing system 100 may be a mobile (e.g., wireless) computing system such as a cellular telephone, personal digital assistant (PDA), text messaging system, and/or a computing device that combines the functionality of a messaging system, PDA and a cellular telephone. Thus, some embodiments may comprise a modem chipset 114 coupled to an antenna 96 and/or global positioning system (GPS) logic 112 likewise coupled to an antenna 98.

The megacell 102 further couples to a battery 110 which provides power to the various processing elements. The battery 110 may be under the control of a power management unit 108. In some embodiments, a user may input data and/or messages into the computer system 100 by way of the keypad 106. Because many cellular telephones also comprise the capability of taking digital still and video pictures, in some embodiments, the computer system 100 may comprise a camera interface 124 which enables camera functionality. For example, the camera interface 124 may enable selective charging of a charge couple device (CCD) array (not shown) for capturing digital images.

Much of the discussion herein is provided in the context of a mobile computing system 100. However, the discussion of the various systems and methods in relation to a mobile computing environment should not be construed as a limitation as to the applicability of the systems and methods described herein to just mobile computing environments. In accordance with at least some embodiments of the invention, many of the components illustrated in FIG. 1, while possibly available as individual integrated circuits, preferably are integrated or constructed onto a single semiconductor die. Thus, the core 116, the DSP 118, DMA 120, camera interface 124, ROM 126, RAM 128, SDRAM 130, storage 132, USB logic 134, stacked OMAP 136, stacked modem 138, graphics accelerator 140, control logic 144, along with some or all of the remaining components, preferably are integrated onto a single die, and thus may be integrated into the computing device 100 as a single packaged component. Having multiple devices integrated onto a single die, especially devices comprising core 116 and RAM 128, may be referred to as a system-on-chip (SoC) or a megacell 102. While using a SoC is preferred is some embodiments, obtaining benefits of on-demand predicate register allocation as described herein does not require the use of a SoC.

In accordance with at least some embodiments, the DSP 118 comprises legacy/on-demand predicate register selection logic 119. The legacy/on-demand predicate register selection logic 119 is configured to select legacy predicate registers or on-demand predicate registers in accordance with the pre-allocation of predicate registers to instructions as described herein. The DSP 118 may comprise a register set, work units, and a storage medium with instructions for execution by the DSP 118. The instructions may have been previously generated, for example, by a code generation tool 129 that pre-allocates the legacy predicate registers or on-demand predicate registers. In FIG. 1, the code generation tool 129 is stored in RAM 128 for execution on the mobile computing system 100. In alternative embodiments, the code generation tool 129 is executed on another computer and the generated instructions are provided to the mobile computing system 100 for execution by the DSP 118.

In at least some embodiments, instructions with pre-allocated legacy predicate registers or on-demand predicate registers (separate from the legacy predicate registers) are fetched from a storage medium for execution by the DSP 118 in a multi-instruction packet. The ability to select on-demand predicate registers for particular instructions of a fetched multi-instruction packet is accomplished without changing the opcode space for the DSP 118. As an example, an on-demand predicate register may be selected for an instruction of the multi-instruction fetch packet based on replacement of an instruction space in the multi-instruction fetch packet with on-demand predication control bits. In some embodiments, a time limit (e.g., a number of cycles) can be set for selection of the on-demand predicate registers. The selection of on-demand predicate registers reverts to selection of legacy predicate registers when the time limit has passed.

Figure 2:
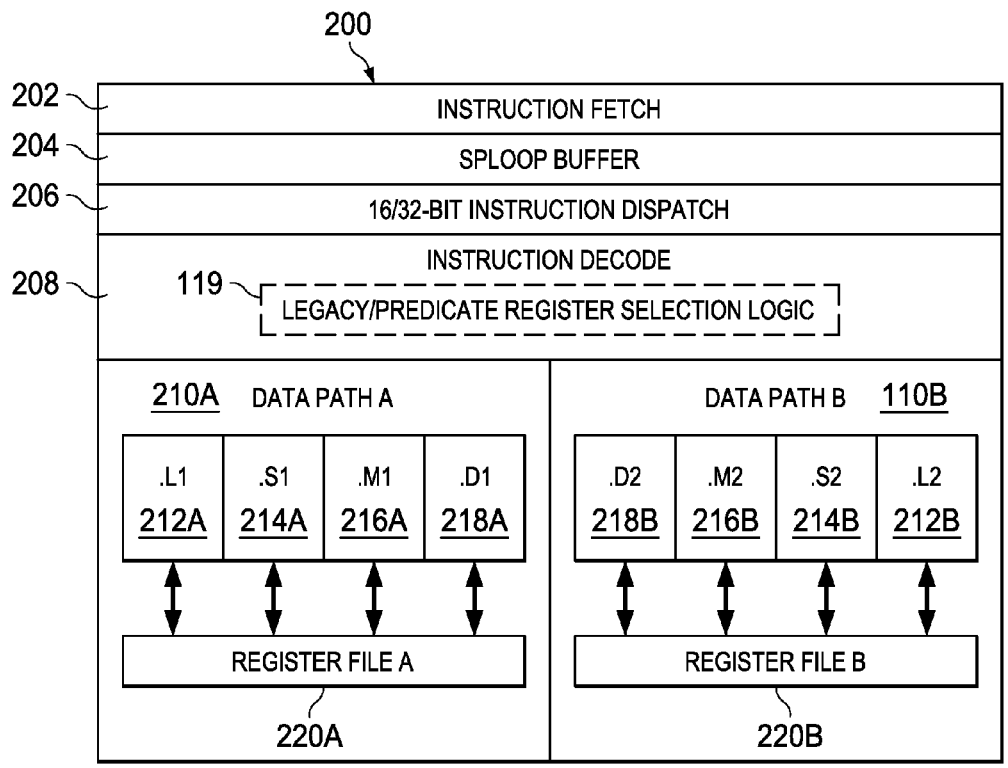
FIG. 2 illustrates a digital signal processor (DSP) core architecture in accordance with an embodiment of the disclosure.

FIG. 2 illustrates a digital signal processor (DSP) core architecture 200 in accordance with an embodiment of the disclosure. The DSP architecture 200 corresponds to the C64x+™ DSP core, but may also correspond to other DSP cores as well. In general, the C64x+™ DSP core is an example of a very-long instruction word (VLIW) architecture. As shown in FIG. 2, the DSP core architecture 200 comprises an instruction fetch unit 202, a software pipeline loop (SPLOOP) buffer 204, a 16/32-bit instruction dispatch unit 206, and an instruction decode unit 208. The instruction fetch unit 202 is configured to manage instruction fetches from a memory (not shown) that stores instructions with pre-allocated legacy predicate registers or on-demand predicate registers for execution by the DSP core architecture 200. The SPLOOP buffer 204 is configured to store a single iteration of a loop and to selectively overlay copies of the single iteration in a software pipeline manner. The 16/32-bit instruction dispatch unit 206 is configured to split the fetched instruction packets into execute packets, which may be one instruction or multiple parallel instructions (e.g., two to eight instructions). The 16/32-bit instruction dispatch unit 206 also assigns the instructions to the appropriate work units described herein. The selection of pre-allocated legacy predicate registers or on-demand predicate registers is performed by the instruction decode unit 208. The instruction decode unit 208 is also configured to decode the source registers, the destination registers, and the associated paths for the execution of the instructions in the work units described herein.

In accordance with C64+ DSP core embodiments, the instruction fetch unit 202, 16/32-bit instruction dispatch unit 206, and the instruction decode unit 208 can deliver up to eight 32-bit instructions to the work units every CPU clock cycle. The processing of instructions occurs in each of two data paths 210A and 210B. As shown, the data path A 210A comprises work units, including a L1 unit 212A, a S1 unit 214A, a M1 unit 216A, and a D1 unit 218A, whose outputs are provided to register file A 220A. Similarly, the data path B 210B comprises work units, including a L2 unit 212B, a S2 unit 214B, a M2 unit 216B, and a D2 unit 218B, whose outputs are provided to register file B 220B.

In accordance with C64x+ DSP core embodiments, the L1 unit 212A and L2 unit 212B are configured to perform various operations including 32/40-bit arithmetic operations, compare operations, 32-bit logical operations, leftmost 1 or 0 counting for 32 bits, normalization count for 32 and 40 bits, byte shifts, data packing/unpacking, 5-bit constant generation, dual 16-bit arithmetic operations, quad 8-bit arithmetic operations, dual 16-bit minimum/maximum operations, and quad 8-bit minimum/maximum operations. The S1 unit 214A and S2 unit 214B are configured to perform various operations including 32-bit arithmetic operations, 32/40-bit shifts, 32-bit bit-field operations, 32-bit logical operations, branches, constant generation, register transfers to/from a control register file (the S2 unit 214B only), byte shifts, data packing/unpacking, dual 16-bit compare operations, quad 8-bit compare operations, dual 16-bit shift operations, dual 16-bit saturated arithmetic operations, and quad 8-bit saturated arithmetic operations. The M1 unit 216A and M2 unit 216B are configured to perform various operations including 32×32-bit multiply operations, 16×16-bit multiply operations, 16×32-bit multiply operations, quad 8×8-bit multiply operations, dual 16×16-bit multiply operations, dual 16×16-bit multiply with add/subtract operations, quad 8×8-bit multiply with add operation, bit expansion, bit interleaving/de-interleaving, variable shift operations, rotations, and Galois field multiply operations. The D1 unit 218A and D2 unit 218B are configured to perform various operations including 32-bit additions, subtractions, linear and circular address calculations, loads and stores with 5-bit constant offset, loads and stores with 15-bit constant offset (the D2 unit 218B only), load and store doublewords with 5-bit constant, load and store nonaligned words and doublewords, 5-bit constant generation, and 32-bit logical operations. Each of the work units reads directly from and writes directly to the register file within its own data path. Each of the work units is also coupled to the opposite-side register file's work units via cross paths. For more information regarding the architecture of the C64x+ DSP core and supported operations thereof, reference may be had to Literature Number: SPRU732H, "TMS320C64x/C64x+ DSP CPU and Instruction Set", October 2008, which is hereby incorporated by reference herein.

In accordance with some embodiments, registers A0-A2 of the register file A 220A are predefined as legacy predicate registers. Similarly, registers B0-B2 of the register file B 220B are predefined as legacy predicate registers. In addition, a plurality of on-demand predicate registers, separate from the legacy predicate registers, may be selected without changing the opcode space of the DSP 200. For example, to select any of the on-demand predicate registers to an instruction of a multi-instruction fetch packet, the fetch packet is encoded by an assembler or complier such that an instruction space in the multi-instruction fetch packet is replaced with on-demand predication control bits. The instruction space may correspond to a first instruction space or last instruction space of the multi-instruction fetch packet. Subsequently, the fetch packet is decoded by the 16/32 bit instruction dispatch unit 206 and instruction decode unit 208. The output of the instruction decode unit 208 includes a predicate register selector to control the reading of a predication value from one of the register files.

In at least some embodiments, a multi-bit header signals (similar to pushing the shift key on a keyboard to alter the meaning of a key stoke) use of the on-demand predicate registers. For example, a creg value plus z value of "1111" may signal use of on-demand predicate registers. Following this multi-bit header, the remaining instruction space (28 bits) may correspond to on-demand predicate register selection bits and a sense bit for each on-demand predicate register to be allocated. As an example, if A16-A18 and B16-B18 of the register files A and B (220A and 220B) are the on-demand predicate registers and the eighth instruction of a multi-instruction fetch packet has the bits: 1111 001x 110x 101x 100x 011x 010x 001x (where x is the sense bit and may be 0 or 1), then the first instruction of the multi-instruction fetch packet uses B16, the second uses B17, the third uses B18, the fourth uses A16, the fifth uses A17, the sixth uses A18, and the seventh uses B16 again.

In at least some embodiments, inclusion of on-demand predication control bits in a multi-instruction fetch packet overrides control bits (e.g., creg and z bits for each instruction) in the multi-instruction fetch packet for selection of legacy predicate registers. Further, use of on-demand predicate registers may be designated for a selected number of cycles (e.g., using a MVC instruction).

As an example of the operation of the DSP architecture 200, multi-instruction fetch packets are fetched from memory and operated on. The fetched instructions already have legacy predicate registers or on-demand predicate registers pre-allocated thereto. A fetch packet may comprise eight instructions, each having 32-bits (i.e., a total of 256-bits per fetch packet), which are executed in parallel or in series depending on the instruction type, etc. The opcode space for each instruction of a fetch packet enables selection of legacy predicate registers to an instruction. More specifically, in the C64x+™ DSP architecture, the "creg" field in the opcode space of each instruction enables selection of legacy predicate registers (one of A0-A2 or B0-B2) to a particular instruction.

In at least some embodiments, the pre-allocation of predicate registers occurs during a technique referred to as software pipelining (sometimes referred to as low-level multithreading) performed by a compiler such as TI's Code Composer Studio, in which instructions will be executed in a manner that utilizes different DSP work units (e.g., there are eight work units in the C64x+™ DSP architecture) to improve processing efficiency. Such strategies of increasing instruction level parallelism cause several of these instructions to be executed speculatively, with the commitment of the results to memory being predicated. In other words, software pipelining tends to increase use of predicate registers to guard the writes.

For the exemplary opcode space of the C64x+™ DSP architecture, the creg+z value "1111" is the only available opcode space that is not defined and can therefore be used to signal on-demand predicate register allocation, separate from the predefined registers A0-A2 and B0-B2. As an example, if the creg+z value "1111" is written for a predetermined instruction space of a multi-instruction fetch packet, the remaining bits of this predetermined instruction space are interpreted as on-demand predication control bits. In at least some embodiments, these on-demand predication control bits override any legacy predication control bits for instructions of the multi-instruction fetch packet. The on-demand predication control bits should indicate a particular on-demand predicate register and a sense bit for each conditional instruction of the related multi-instruction fetch packet. Assuming an instruction space of 32-bits, 28 on-demand predication control bits (32-bits minus 4-bits related to the creg+z fields) are available. In this example, the 28 on-demand predication control bits may be used to signal up to seven different on-demand predicate registers (a 3-bit value) and their corresponding sense values (a 1-bit value).

If the creg+z value is any value other than "1111", the predetermined instruction space of the multi-instruction fetch packet is just another legacy instruction and is interpreted according to predefined legacy opcodes. In at least some embodiments, the predetermined instruction space described herein is the last instruction space of a multi-instruction fetch packet. Alternatively, the predetermined instruction space is the first instruction space of a multi-instruction fetch packet or another predetermined instruction space (e.g., one of the 8 instruction spaces of a 256-bit fetch packet). Using the first or last instruction space facilitates parsing and analysis of on-demand predication control bits, but is not required.

In at least some embodiments, an on-demand predication mode may be signaled for a selected number of cycles. For example, a move (MVC) command may be used to signal the selected number of cycles for the on-demand predication mode (e.g., 100 cycles) and the on-demand predicate registers to be allocated (e.g., legacy predicate register value+10). During the on-demand predication mode, any legacy creg values in the instructions of a multi-instruction fetch packet will select on-demand predicate registers rather than the legacy predicate registers. As an example, a +10 value for on-demand predicate register selection would result in A10-A12 and B10-B12 being selected in response to the legacy creg values instead of the predefined predicate registers (i.e., A10 instead of A0, A11 instead of A1, A12 instead of A2, B10 instead of B0, B11 instead of B1, B12 instead of B2). When the selected number of cycles expires, the on-demand predication mode ends and the legacy creg values select the legacy predicate registers again.

In some embodiments, opcodes for both legacy predicate registers and on-demand predicate registers are allowed in the same multi-instruction fetch packet. As an example, in an eight-instruction fetch packet with seven legacy instructions and an instruction space for on-demand control bits, seven legacy instructions may signaled as "unconditional" (creg="000") and the eighth instruction space overrides the "unconditional" designation with on-demand predicate register allocation. Alternatively, if the seven instructions use a creg field value other than the "unconditional" value, then on-demand predication control bits in the eighth instruction space are ignored and the legacy predicate register allocation is honored.

As algorithms to be executed increase in complexity, more predicate registers are needed without changing the legacy opcode. Providing for increased predicate registers within the existing opcode space as described herein facilitates compatibility of on-demand predicate register selection with legacy coding. Because the on-demand predicate registers are mutually exclusive form the legacy predicate registers, the total number of predicate registers is increased. Even though embodiments enable pre-allocation of additional predicate registers (legacy predicate registers and on-demand predicate registers), the same number of predicate registers are read as part of instruction decode. This is because pre-allocation of on-demand predicate registers can be performed by a compiler or assembly language programmer without changing the number of registers that are read. Thus, while pre-allocation of legacy predicate registers and on-demand predicate registers offer the capability of up to 12 predicate registers, only 6 predicate registers are read at a time as in the legacy predication technique. Limiting the number of registers being read at a time is important because it determines the number of ports to the register file. Further, the size of a register file generally increases approximately as the square of the number of ports. Accordingly, in some embodiments, the number of predicate registers that can be read at a time does not change (i.e., the number of ports to the register file does not change), but the total number of predicate registers that can be pre-allocated does change (e.g., the number is doubled). In this manner, the speed of processing is not compromised with the utilization of on-demand predicate registers in addition to legacy predicate registers (increasing the total number of predicate registers from 6 to 12).

Figure 3:
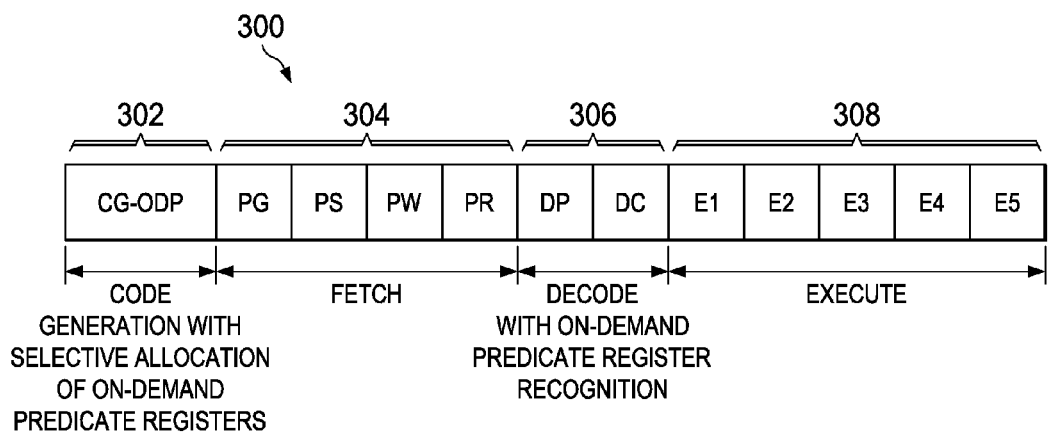
FIG. 3 illustrates a block diagram of phases for on-demand predication in accordance with an embodiment of the disclosure.

FIG. 3 illustrates a block diagram 300 of phases for on-demand predication implementation in accordance with an embodiment of the disclosure. As shown, the block diagram 300 comprises a code generation phase 302 with selective pre-allocation of on-demand predicate registers. The code generation phase 302 also may pre-allocate legacy predicate registers. Various pipeline phases of a DSP are also shown following the code generation phase 302. In fetch phase 304, instructions generated during the code generation phase 302 are fetched from memory. As shown, the fetch phase 304 of block diagram 300 comprises a program address generate (PG) sub-phase, a program address send (PS) sub-phase, a program address ready wait (PW) sub-phase, and a program fetch packet receive (PR) sub-phase. In decode phase 306, the fetched instructions are decoded including the selection of any legacy predicate registers and on-demand predicate registers signalled in the fetched instructions. The decode phase 306 of block diagram 300 may comprise an instruction dispatch (DP) sub-phase and an instruction decode (DC) sub-phase as shown. Finally, in execution phase 308, the decoded and dispatched instructions are carried out by works units of the DSP. As shown, the execution phase 308 may correspond to multiple execution cycles (E1-E5).

Figure 4:
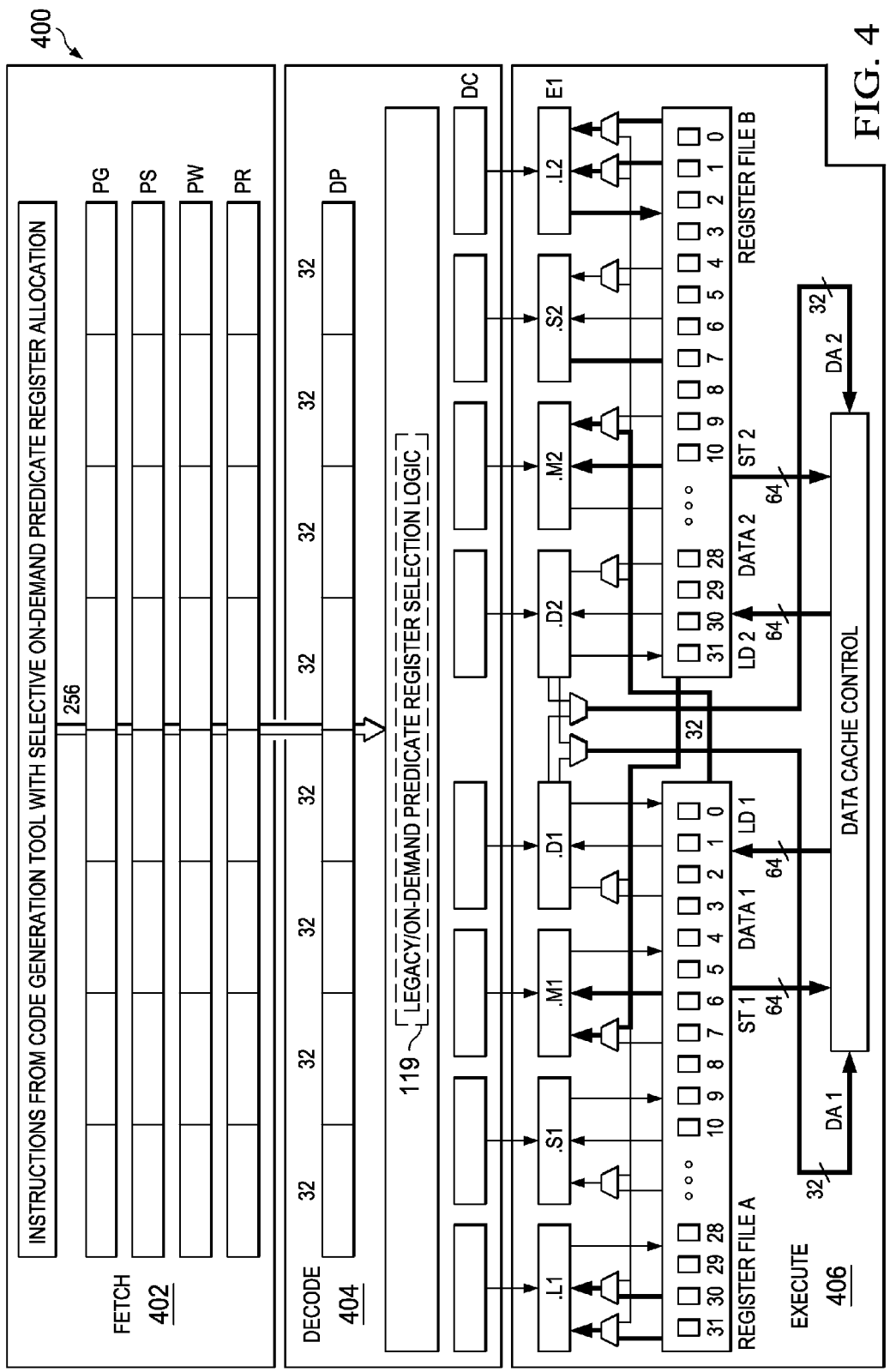
FIG. 4 illustrates a pipeline block diagram related to the pipeline phases of FIG. 3 in accordance with an embodiment of the disclosure.

FIG. 4 illustrates a pipeline block diagram 400 related to the pipeline phases of FIG. 3 in accordance with an embodiment of the disclosure. In FIG. 4, the input to the fetch block 402 comprises instructions with pre-allocated legacy predicate registers and on-demand predicate registers generated by the code generation tool described herein. In FIG. 4, the fetch block 402 corresponds to the fetch phase 304 of FIG. 3. Meanwhile, the decode phase 404 corresponds to the decode phase 306 of FIG. 3 and the execute block 406 corresponding to the execute phase 308 of FIG. 3. In FIG. 4, the fetch block 402 shows the progression of multi-instruction fetch packets through the PG, PS, PW and PR sub-phases. In the decode block 404, instructions of the input multi-instruction fetch packet are dispatched and decoded, resulting in the various operations of the instructions being provisioned to the work units of the DSP. As shown, decode block 404 comprises legacy/on-demand predicate register selection logic 119 to enable proper selection of legacy predicate registers or on-demand predicate registers signalled by the instructions. The execute block 406 comprises the work units, register files, and other logic known in the art.

Figures 5, 6:
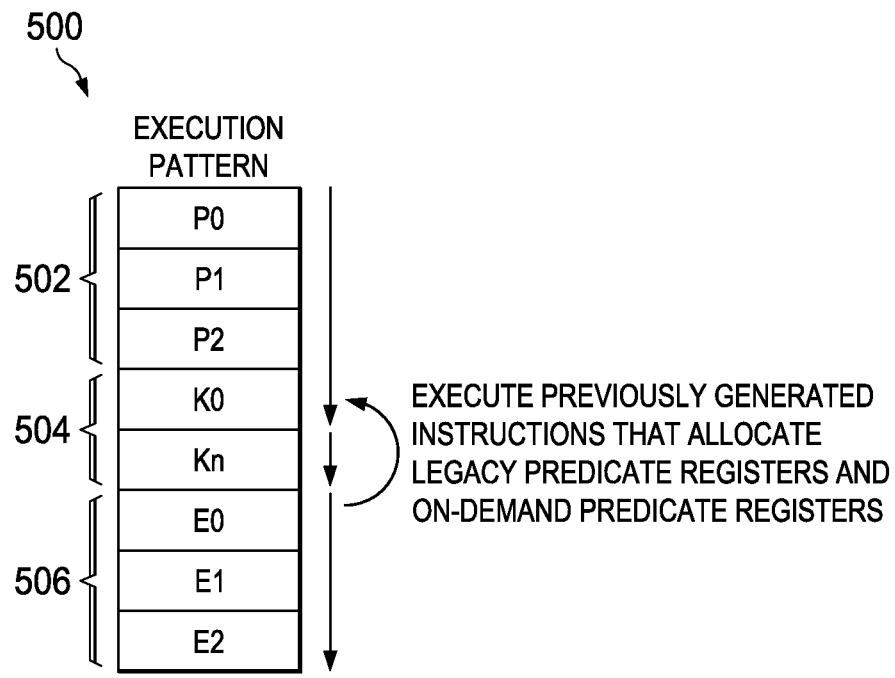
FIG. 5 illustrates an execution pattern in accordance with an embodiment of the disclosure.
FIG. 6 illustrates an instruction format in accordance with an embodiment of the disclosure.

FIG. 5 illustrates an execution pattern 500 in accordance with an embodiment of the disclosure. The execution pattern 500 comprises a prologue phase 502, a kernel phase 504, and an epilogue phase 506. After a predetermined number of operations (e.g., three operations) in the prologue phase 502, the execution pattern enters the kernel phase 504, in which a number of operations are executed in a loop. After the kernel phase 504 completes, the epilogue phase 506 comprises a predetermined number of operations (e.g., three operations). During the execution pattern 500, previously generated instructions with pre-allocated legacy predicate registers and on-demand predicate registers are executed.

FIG. 6 illustrates an instruction format 600 in accordance with an embodiment of the disclosure. As shown, the instruction format 600 comprises 32-bits, where bits 31-29 correspond to a creg field, bit 28 corresponds to a z field, bits 27-2 corresponds to operation information, bit 1 corresponds to an s (data path side selection) field, and bit 0 corresponds to a p (parallel execution) field. In at least some embodiments, if the creg field value plus z field value of a predetermined instruction (e.g., the eighth instruction of a multi-instruction fetch packet) is not "1111", then any legacy predication signalling in the instructions of the multi-instruction fetch packet will be used. Otherwise, on-demand predication control bits following the "1111" signal encode on-demand predicate registers to be used for instructions of the multi-instruction fetch packet. In such case, any legacy predication signalling in the multi-instruction fetch packet is overridden.

Figure 7:
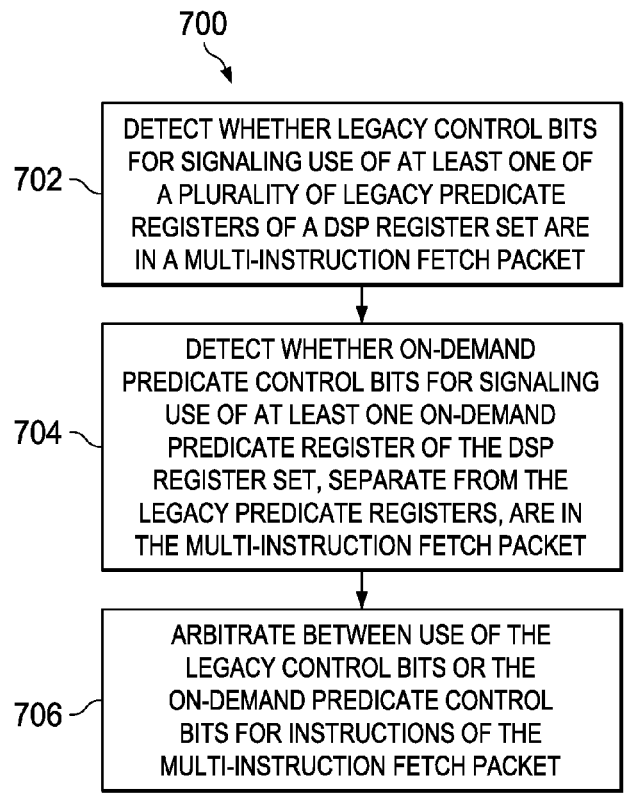
FIG. 7 illustrates a method for a DSP in accordance with an embodiment of the disclosure.

FIG. 7 illustrates a method 700 for a DSP in accordance with an embodiment of the disclosure. Though depicted sequentially as a matter of convenience, at least some of the actions shown can be performed in a different order and/or performed in parallel. Additionally, some embodiments may perform only some of the actions shown. As shown, the method 700 comprises detecting whether legacy control bits for allocating at least one of a plurality of legacy predicate registers of a DSP register set are in a multi-instruction fetch packet (block 702). The method 700 also comprises detecting whether on-demand predication control bits for allocating at least one on-demand predicate register of the DSP register set, separate from the predefined predicate registers, are in the multi-instruction fetch packet (block 704). In some embodiments, the on-demand predication control bits are located within a first or last instruction space of the multi-instruction fetch packet. Finally, the method 700 comprises arbitrating between use of the legacy control bits or the on-demand predicate control bits for instructions of the multi-instruction fetch packet (block 706). For example, the arbitration step comprises overriding control bits for legacy predicate register selection with on-demand predication control bits. An another example, the arbitration step may comprise forcing control bits to signal instructions of the multi-instruction fetch packet as unconditional and then overriding the unconditional signaling then with on-demand predication control bits.

Figure 8:
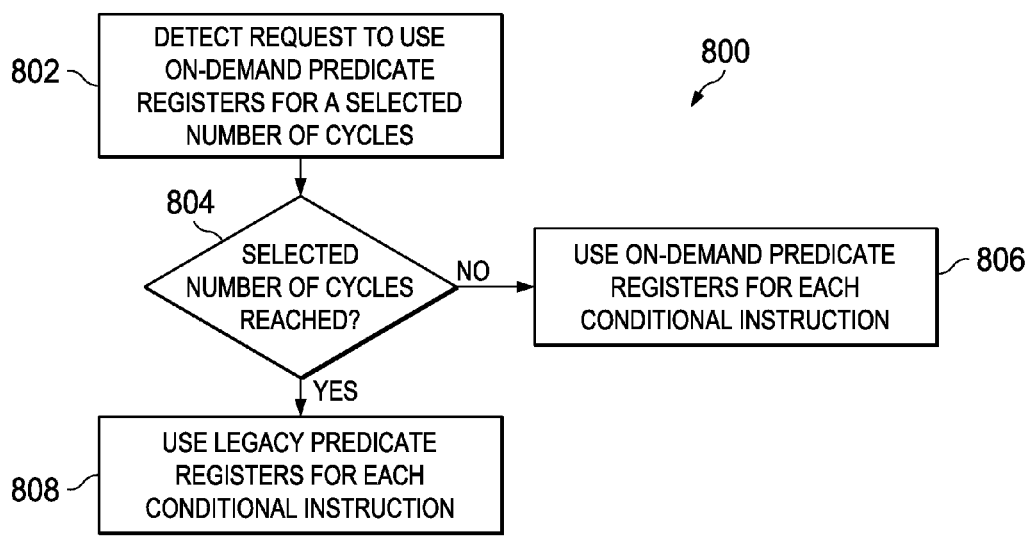
FIG. 8 illustrates a method for temporary use of on-demand predication control registers in accordance with an embodiment of the disclosure.

In at least some embodiments, use of on-demand predicate registers may be designated for a selected number of cycles. FIG. 8 illustrates a method 800 for temporary on-demand predicate control register allocation in accordance with an embodiment of the disclosure. As shown, the method 800 comprises detecting a request to use on-demand predicate registers for a selected number of cycles (block 802). For example, a MVC instruction may be implemented for this purpose. If the selected number of cycles has not been reached (determination block 804), on-demand predicate registers are used for each conditional instruction (block 806). If the selected number of cycles has been reached (determination block 804), legacy predicate registers are used for each conditional instruction (block 808).

The above discussion is meant to be illustrative of the principles and various embodiments of the present invention. Numerous variations and modifications will become apparent to those skilled in the art once the above disclosure is fully appreciated. For example, although embodiments described herein are mapped to the C64x+™ DSP core, it should be understood that the on-demand predication techniques disclosed herein may be mapped to other DSP cores. Other DSP cores may have different register sizes, different arrangement of work units (e.g., L units, D units, S units, and M units), different instruction sets, different operations (e.g., intrinsics) and/or different multi-instruction fetch packet sizes. It is intended that the following claims be interpreted to embrace all such variations and modifications.

What is claimed is:
1. A digital signal processor (DSP), comprising:
an instruction fetch unit operable to fetch a predetermined number of instructions in a multi-instruction fetch packet, each instruction having a predetermined fixed length and including a conditional register (creg) field designating unconditional operation or operation conditional upon an indicated legacy predicate register and each instruction including other fields;

a register set of a first predetermined plurality of registers storing data, said register set including a second predetermined plurality of legacy predicate registers less than said first plurality of registers;

an instruction decode unit in communication with the instruction fetch unit, said instruction decode unit decoding instructions fetched by said instruction fetch unit, said instruction decode unit signaling for each instruction one of legacy predicate registers or on-demand predicate registers; and a plurality of work units in communication with the instruction decode unit, each work unit is operable to perform an operation specified by a corresponding instruction fetched by said instruction fetch unit and decoded by said instruction decode unit wherein each work unit performs said operation unconditionally if said conditional register (creg) field of said corresponding instruction designated unconditional operation, performs said operation conditionally dependent upon whether said legacy predicate register indicated by said conditional register (creg) field of said corresponding instruction indicates the instruction should be executed or skipped if said instruction decode unit signals legacy predicate registers, and performs said operation conditionally dependent upon whether an on-demand predicate register selected from a second predetermined plurality of on-demand predicate registers of said register set distinct from said plurality of legacy predicate registers indicated by said conditional register (creg) field of said corresponding instruction indicates the instruction should be executed or skipped if said instruction decode unit signals on-demand predicate registers, wherein, said instruction decode unit signals legacy predicate registers or on-demand predicate registers dependent upon bits of an instruction other than said corresponding instruction without changing the decoding of said other fields of said corresponding instruction; and said instruction decode unit employs bits of one instruction at a predetermined instruction space within said multi-instruction fetch packet as said bits of an instruction other than said corresponding instruction.

2. The DSP of claim 1 wherein:

said instruction decode unit includes a predicate register selection logic configured to detect a predetermined multi-bit header in said predetermined instruction space of said multi-instruction fetch packet and, if said predetermined multi-bit header is detected, to interpret at least some remaining bits of said predetermined instruction space as on-demand predicate register control bits.

3. The DSP of claim 2 wherein:

said conditional register (creg) field designates a legacy predicate register by register number;

the predicate register selection logic is configured to detect an offset from a base register; and said work unit performs said operation conditionally dependent upon whether said legacy predicate register having a register number designated by said conditional register (creg) field of said corresponding instruction has a predetermined state if said instruction decode unit signals legacy predicate registers, and performs said operation conditionally dependent upon whether an on-demand predicate register having a register number equal to said register number designated by said conditional register (creg) field plus said offset has a predetermined state if said instruction decode unit signals on-demand predicate registers.

4. The DSP of claim 1 wherein, in response to an on-demand control signal, the predicate register selection logic is configured to select on-demand predicate registers instead of legacy predicate registers for a selected number of cycles.

* * * * *